(12) United States Patent
Binshtock et al.

(10) Patent No.: US 8,126,927 B1
(45) Date of Patent: Feb. 28, 2012

(54) DATA STRUCTURE, METHOD, AND COMPUTER PROGRAM FOR PROVIDING A LINKED LIST IN A FIRST DIMENSION AND A PLURALITY OF LINKED LISTS IN A SECOND DIMENSION

(75) Inventors: Michael Binshtock, Tel Aviv (IL); Liran Ravid, Givataim (IL)

(73) Assignee: Amdocs Software Systems Limited, Dublin (IE)

( * ) Notice: Subject to any disclaimer, the term of this patent is extended or adjusted under 35 U.S.C. 154(b) by 543 days.

(21) Appl. No.: 12/134,957

(22) Filed: Jun. 6, 2008

(51) Int. Cl.
*G06F 17/30* (2006.01)

(52) U.S. Cl. ........................................ 707/800

(58) Field of Classification Search .................. None
See application file for complete search history.

(56) References Cited

U.S. PATENT DOCUMENTS

| | | | | |
|---|---|---|---|---|
| 5,752,243 | A * | 5/1998 | Reiter et al. ............................ | 1/1 |
| 5,864,857 | A * | 1/1999 | Ohata et al. ............................ | 1/1 |
| 6,049,802 | A * | 4/2000 | Waggener et al. ............. | 707/800 |
| 6,149,318 | A | 11/2000 | Chase et al. ................... | 395/704 |
| 6,173,373 | B1 * | 1/2001 | Bonola .......................... | 711/147 |
| 6,418,517 | B1 * | 7/2002 | McKenney et al. ............ | 711/151 |
| 6,883,006 | B2 * | 4/2005 | Webber .......................... | 707/800 |
| 6,941,308 | B1 * | 9/2005 | Chilton ................................. | 1/1 |
| 7,047,245 | B2 * | 5/2006 | Jones ................................... | 1/1 |
| 7,310,649 | B1 * | 12/2007 | Ginsberg ............................. | 1/1 |
| 7,395,274 | B2 * | 7/2008 | Moir et al. .......................... | 1/1 |
| 7,424,477 | B1 * | 9/2008 | Martin et al. ........................ | 1/1 |
| 7,533,138 | B1 * | 5/2009 | Martin ................................ | 1/1 |
| 7,719,532 | B2 * | 5/2010 | Schardt et al. ............... | 345/420 |
| 7,743,072 | B2 * | 6/2010 | Polyudov ..................... | 707/790 |
| 2002/0184404 | A1 * | 12/2002 | Lerman ........................ | 709/318 |
| 2004/0064430 | A1 * | 4/2004 | Klein et al. ...................... | 707/1 |

OTHER PUBLICATIONS

Kim et al., "Improved Concurrency Control Technique with Lock-Free Querying for Multi-dimensional Index Structure," AIRS 2005, LNCS 3689, pp. 43-55, 2005.
Binder et al. "Multiversion Concurrency Control for Multidimensional Index Structures," DEXA 2007, LNCS 4653, pp. 172-181, 2007.

* cited by examiner

*Primary Examiner* — Tim T Vo
*Assistant Examiner* — Michelle Owyang
(74) *Attorney, Agent, or Firm* — Zilka-Kotab, PC (57) ABSTRACT

A data structure, method, and computer program provide a linked list in a first dimension and a plurality of linked lists in a second dimension. In use, a linked list in a first dimension is provided. Further, the linked list in the first dimension includes a plurality of nodes. Additionally, each node includes a head pointer and a tail pointer. In addition, a plurality of linked lists in a second dimension is provided. Furthermore, the tail pointer of one of the nodes in the linked list in the first dimension points to a first node in one of the linked lists in the second dimension.

22 Claims, 7 Drawing Sheets

DATA STRUCTURE, METHOD, AND COMPUTER PROGRAM FOR PROVIDING A LINKED LIST IN A FIRST DIMENSION AND A PLURALITY OF LINKED LISTS IN A SECOND DIMENSION

FIELD OF THE INVENTION

The present invention relates to a queue, and more particularly to inserting and removing data from the queue.

BACKGROUND

Traditionally, data processing systems have utilized queues. The queues have been utilized by the data processing systems to store data that is waiting to be processed. However, techniques generally utilized for processing data stored in such queues have exhibited various limitations.

One technique conventionally utilized for processing data in the queue has been to utilize a lock on the queue. As an example, a locking queue utilizes a lock to indicate that data is being read and written to the queue. As a result of the locking queue, a speed of processing is reduced by preventing other processing from being performed while the queue is locked.

Another technique conventionally utilized for processing data in the queue has been to utilize a lock free queue. For example, the lock free queue allows for data to be read and written to the queue without utilizing a lock. However, traditionally lock free queues have only allowed for a single dimension queue.

There is thus a need for addressing these and/or other issues associated with the prior art.

SUMMARY

A data structure, method, and computer program provide a linked list in a first dimension and a plurality of linked lists in a second dimension. In use, a linked list in a first dimension is provided. Further, the linked list in the first dimension includes a plurality of nodes. Additionally, each node includes a head pointer and a tail pointer. In addition, a plurality of linked lists in a second dimension is provided. Furthermore, the tail pointer of one of the nodes in the linked list in the first dimension points to a first node in one of the linked lists in the second dimension.

DETAILED DESCRIPTION

Figure 1:
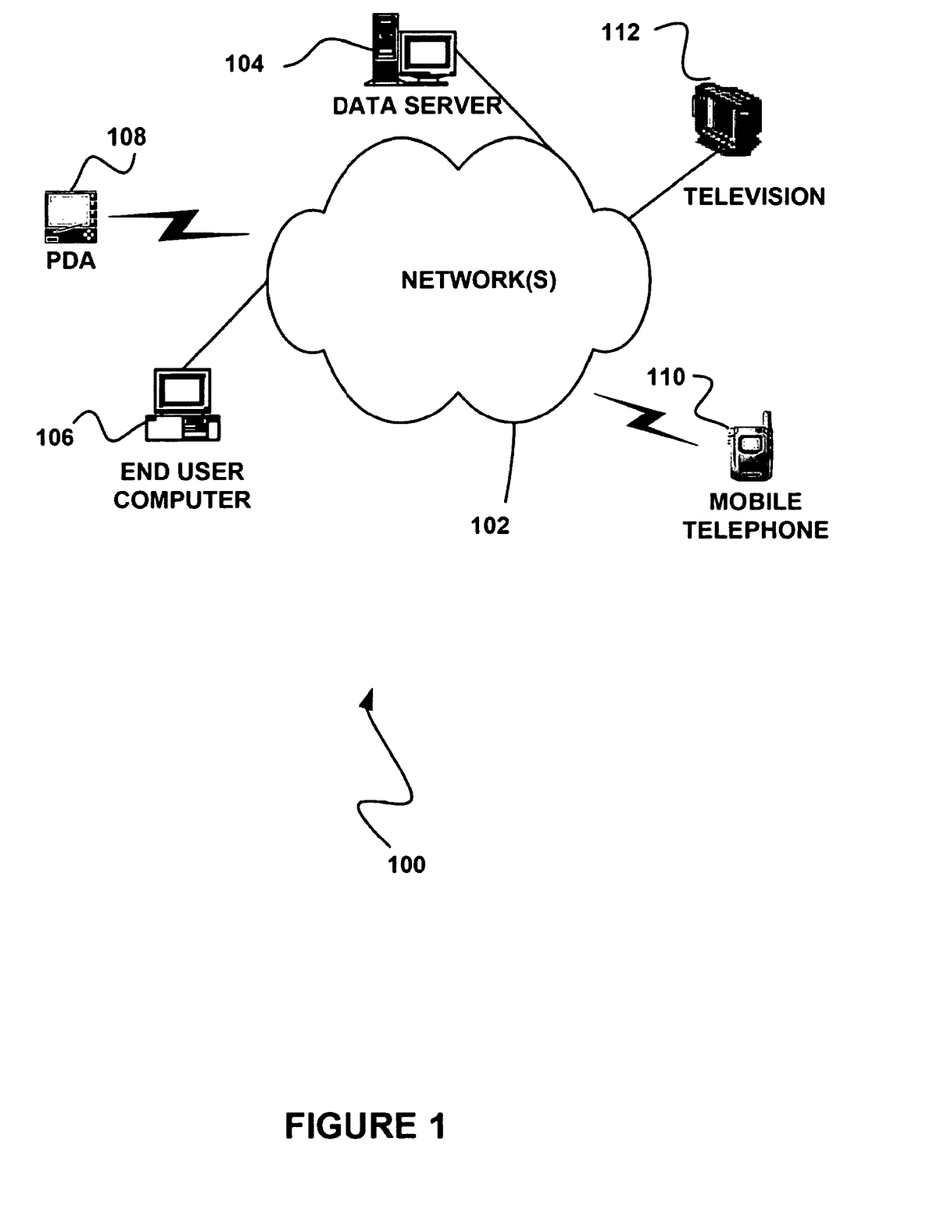
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (ADA) device 108, a mobile phone device 110, a television 112, etc.

Figure 2:
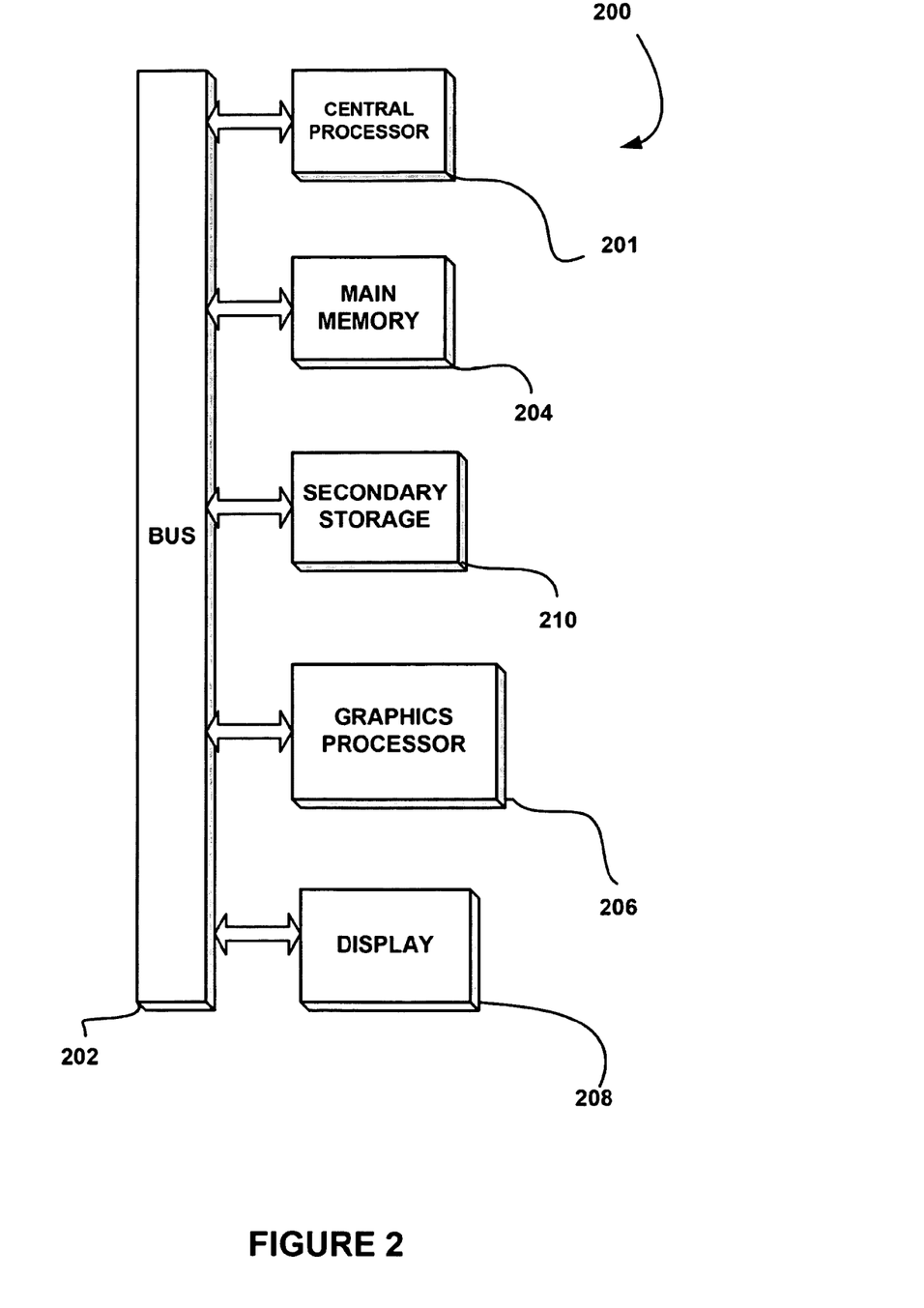
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
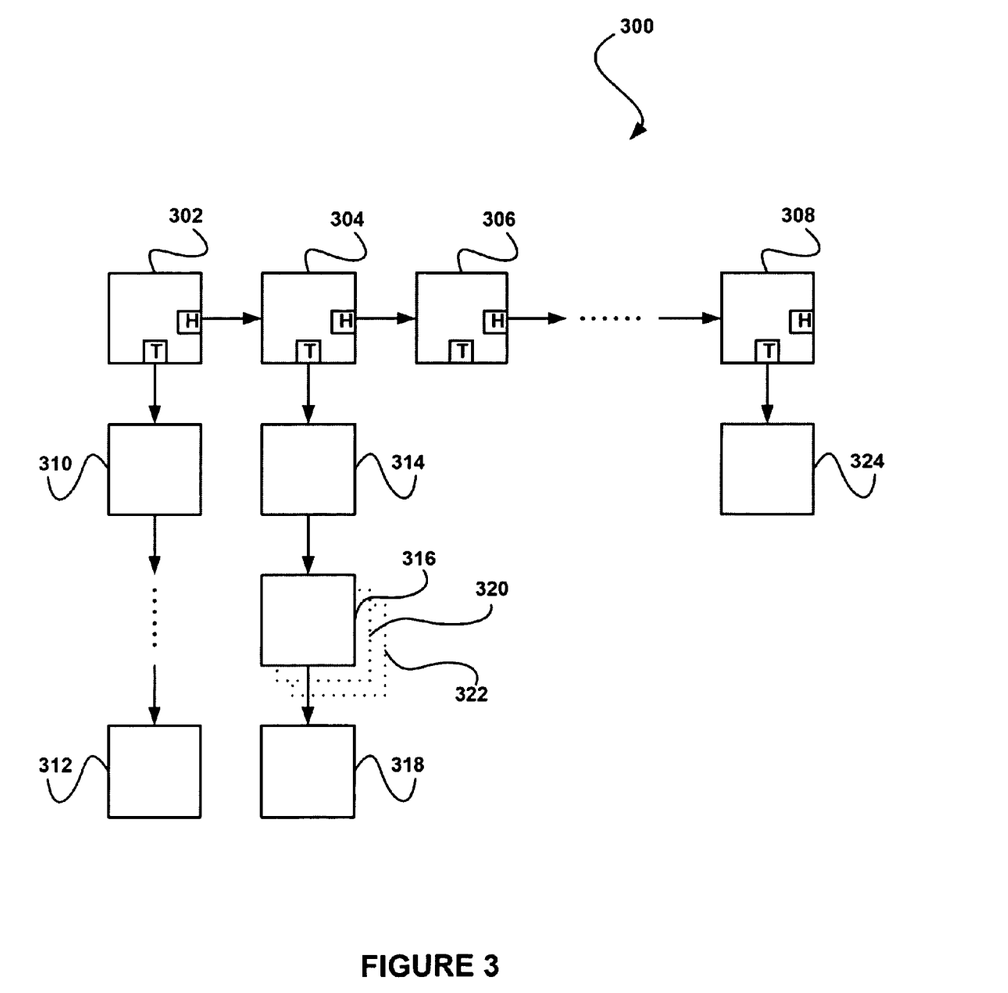
FIG. 3 illustrates a data structure including a linked list in a first dimension a plurality of linked lists in a second dimension, in accordance with another embodiment.

FIG. 3 illustrates a data structure 300 including a linked list in a first dimension and a plurality of linked lists in a second dimension, in accordance with another embodiment. As an option, the data structure 300 may be implemented in the context of the details of FIGS. 1 and/or 2. Of course, however, the data structure 300 may be implemented in any desired environment.

As shown, a linked list in a first dimension is provided. In the context of the present description, the linked list in the first dimension includes a plurality of nodes 302-308. Optionally, each of the nodes may include any data structure capable of being included in a linked list. As an option, the linked list may include a queue, a single linked list, a double linked list, a circularly linked list, etc. For example, the linked list may include a ready queue. As an option, the nodes of the linked list in the first dimension may be available for processing.

Further, with respect to the present description, each node of the linked list in the first dimension includes a head pointer and a tail pointer. As an option, each pointer (i.e. head pointer and/or tail pointer) may point to another node (e.g. may include a reference to another node). For example, a pointer may point to another node by including a reference to a memory address of the other node. As still yet another option, the pointer may include additional data associated with the node.

In one embodiment, the head pointer may point to a next node in the linked list in the first dimension. Optionally, the head pointer may include a null value if the associated node does not point to another node in the linked list in the first dimension. As an option, the null value may include a zero value, a nil value, a negative value, etc. Further, as yet another option, the null value may include any data capable of indicating that the head pointer does not point to another node. In one exemplary embodiment, the head pointer of a first node in the linked list in the first dimension may point to a second (e.g. next) node in the linked list in the first dimension, whereas the head pointer of another node in the linked list in the first dimension may include the null value if the other node is a last node in the linked list in the first dimension.

Additionally, with respect to the present description, the tail pointer of at least one of the nodes in the linked list in the first direction points to a first node in a linked list in a second dimension (the linked list in the second dimension further described below). Optionally, the tail pointer may include a null value. To this end, each node in the linked list in the first direction may include a tail pointer that points to a first node of a different linked list in the second direction.

Furthermore, in yet another embodiment, additional pointers may be associated with the data structure. As an option, the additional pointers may include a linked list head pointer, a linked list tail pointer, etc. Optionally, the linked list head pointer may point to a first node in the linked list in the first dimension. As yet another option, the linked list tail pointer may point to a last node in the linked list in the first dimension.

In addition, in still yet another embodiment, operations on the additional pointers, the head pointer of the node, and/or the tail pointer of the node may include an atomic operation. Optionally, the operations may include inserting a pointer, removing a pointer, updating a pointer, reading a pointer, etc. Further, as yet another option, the atomic operation may include an operation that may not be interrupted. Additionally, as yet another option, the atomic operation may include a set of computer directives which may be executed sequentially, with no interrupt from any source, including an operating system. For example, the atomic operation may ensure that the set of computer directives are executed before any other operation is performed.

In another embodiment, each node may include an identifier. As an option, the identifier may include any identifying data. Optionally, the identifier may include a unique identifier. For example, the unique identifier for each node may be different from a unique identifier for each other node. Additionally, as yet another option, the unique identifier may include a sequence number, a counter, a timestamp, etc. specific to an individual node.

Further, in yet another embodiment, the identifier may be stored in the node. As an option, the identifier may be stored in the head pointer of the node. As yet another option, the identifier may be stored in the tail pointer of the node. For example, the sequence number identifying the node may be stored in the node, the head pointer of the node, and/or the tail pointer of the node.

Additionally, in the context of the present description, a plurality of linked lists in a second dimension are provided. As an option, one of the linked lists in the second dimension may include a plurality of nodes 310-312. For example, the plurality of linked lists in the second dimension may include a first linked list in the second dimension including a first set of nodes 310-312, a second linked list in the second dimension including a second set of nodes 314-318, and a last linked list in the second dimension including a last set of nodes 324.

Further, as noted above, in the context of the present description, the tail pointer of a node in the linked list in the first dimension points to a first node in one of the linked lists in the second dimension. Optionally, the tail pointer of the node in the linked list in the first dimension may include the null value. As an option, the null value may indicate that a linked list in the second dimension does not exist with respect to such node including tail pointer with the null value. For example, a first node in the first linked list in the second dimension 310 may be pointed to by the tail pointer of the first node 302 of the linked list in the first dimension, a first node in the second linked list in the second dimension 314 may be pointed to by the tail pointer of a second node 304 of the linked list in the first dimension, and a first node in a last linked list in the second dimension 324 may be pointed to by the tail pointer of a last node 308 of the linked list in the first dimension. As yet another example, the tail pointer of a third node 306 of the linked list in the first dimension may include the null value, and thus may not point to any node of a linked list in the second dimension.

Optionally, each node in each linked list in the second dimension may include at least one pointer. For example, each node of one of the linked lists in the second dimension may include a pointer to a next node in the linked list in the second dimension. As yet another option, an operation performed on the pointer associated with each node in the linked list in the second dimension is an atomic operation.

Furthermore, in yet another embodiment, an additional pointer may be associated with each linked list in the second dimension. As an option, the additional pointer may include a second dimension linked list tail pointer, etc. Optionally, the second dimension linked list tail pointer may point to a last node in the one of the linked lists in the second dimension. Further, as yet another option, an operation performed on the second dimension linked list tail pointer should include the atomic operation. For example, the last node in each linked list in the second dimension may be pointed to by the second dimension linked list tail pointer. Additionally, as an option, a plurality of second dimension linked list tail pointers may define the linked lists in the second dimension.

Furthermore, in yet another embodiment, each of the plurality of linked lists in the second dimension may include a sticky queue. As another option, the sticky queue may include data associated an attribute, a characteristic, a type, etc. associated with the other data in the sticky queue. Optionally, the data may include event data, alert data, notification data, and/or any other data capable of being stored in the sticky queue. As an example, the data in the sticky queue may be associated with a customer, a resource, an address, a processor, a thread, an application, etc. Further, as yet another option, the linked list in the second dimension may be utilized to feed nodes to the linked list in the first dimension.

In still yet another embodiment, the node 316 of the one of the linked lists in the second dimension may include a pointer to a node 320 of a linked list in a third dimension. Optionally, the linked list in the third dimension may include a plurality of nodes 320-322. As yet another option, the linked list in the third dimension may include a priority linked list. Still yet as another option, the priority linked list may include a priority queue. To this end, the data structure 300 may optionally include a plurality of linked lists in a third dimension.

As an option, the nodes 320-322 included in the priority linked list pointed to by a first priority node 316 may have a higher priority than another node 318 in the one of the linked lists in the second dimension pointed to by the first priority node 316. For example, the node 316 of the one of the linked lists in the second dimension may include a pointer to a first priority node 320 in the priority linked list in the third dimension. Further, in the context of the current example, the first priority node 320 may include a pointer to a second priority node 322, and the second priority node 322 may include a pointer to a null value. Still, in the context of the current example, the node 316, the first priority node 320, and the second priority node 322 may include a priority higher than the priority of the next node 318 in the linked list in the second direction pointed to by such node 316 in linked list in the second direction.

To this end, the data structure 300 may allow for multiple processing threads to manipulate the data structure 300 at once. Optionally, the data structure 300 may be manipulated by reading, writing, updating, inserting, and/or removing nodes from the data structure 300. For example, a first processing thread may read data from the data structure 300, while a second processing thread may insert data into the data structure 300 and a third processing thread may remove data from the data structure 300. Further, as yet another option, the data structure 300 may optionally be manipulated without using locks. As an example, the data structure 300 may be lock free.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
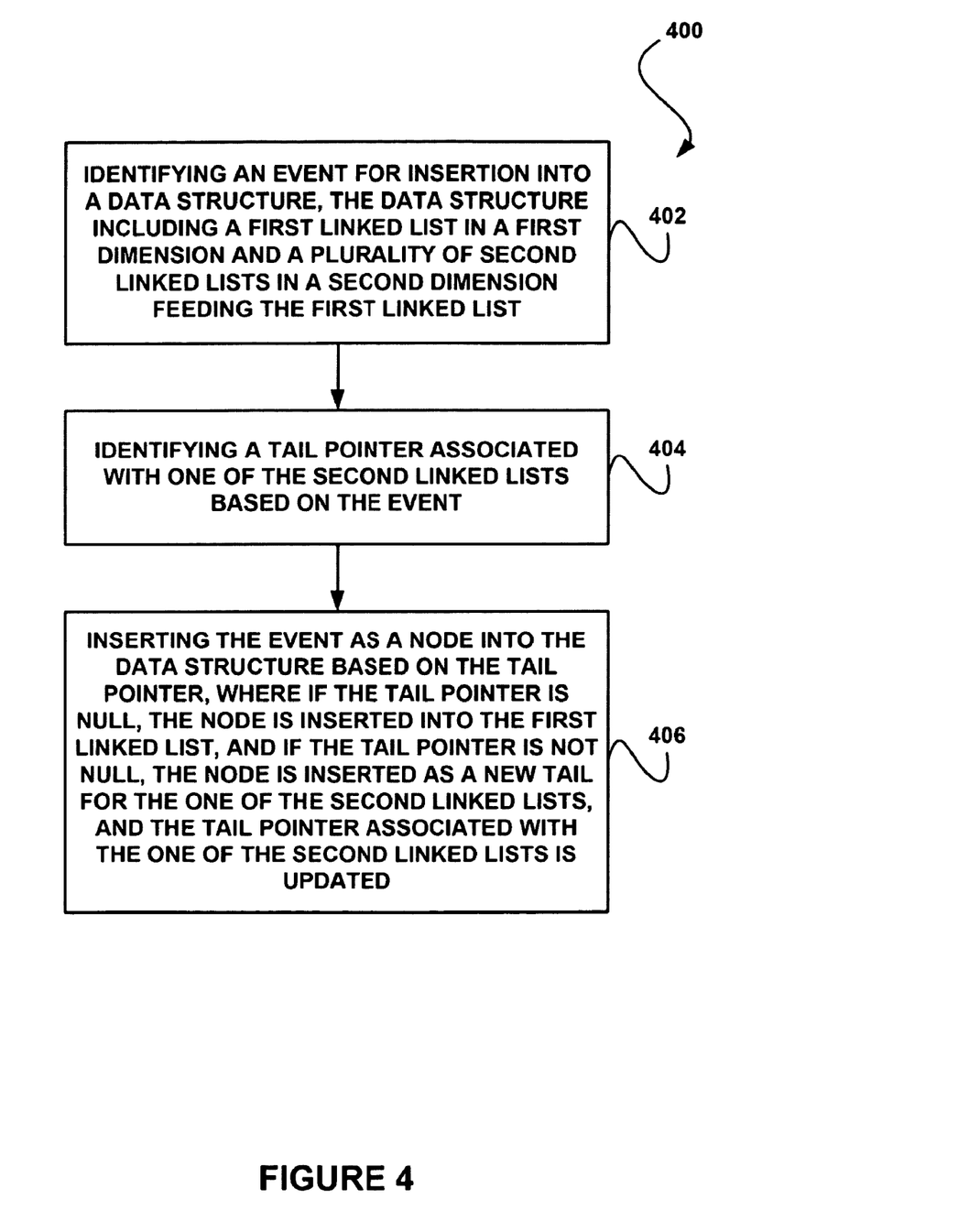
FIG. 4 illustrates a method for inserting an event into a data structure, in accordance with yet another embodiment.

FIG. 4 shows a method 400 for inserting an event into a data structure, in accordance with yet another embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, an event is identified for insertion into a data structure, the data structure including a first linked list in a first dimension and a plurality of second linked lists in a second dimension feeding the first linked list. In one embodiment, the data structure may include the data structure 300 described above with respect to FIG. 3. As an option, the event may include any data capable of being inserted into the data structure. Optionally, the event may include an alert, a message, a notification, a trap, information, etc.

In another embodiment, inserting the event into the data structure may include adding, linking, referencing, etc. the event to the data structure. As an option, the event may be added as a node in the data structure. For example, the node may include the event, and/or any other data associated with the event. In one embodiment, the event may be identified in response to a request for insertion of such event into the data structure, but of course may be identified in any manner.

In addition, a tail pointer associated with one of the second linked lists is identified based on the event. See operation 404. As an option, the tail pointer may be associated with the second linked list by pointing to a last node in the second linked list. The tail pointer may not necessarily be included in the data structure, in one embodiment.

Further, as yet another option, the tail pointer may include a null value if the tail pointer does not point to a node in the second linked list. For example, if there are not any nodes associated with the second linked list, then the tail pointer may include the null value. It should be noted that the tail pointer may be identified in any desired manner that is based on the event (e.g. based on a characteristic of the event, etc.).

Additionally, as shown in operation 406, the event is inserted into the data structure as a node, based on the tail pointer. Furthermore, as shown in operation 406, if the tail pointer is null, the node is inserted into the first linked list, and if the tail pointer is not null, the node is inserted as a new tail node for the one of the second linked lists.

Still yet, as shown in operation 406, upon insertion of the event into the second linked list, the tail pointer associated with the second linked list is updated. In addition, as yet another option, updating the tail pointer associated with the second linked list may include pointing the tail pointer to the inserted node. For example, the tail pointer associated with the second linked list may be updated to point to the node inserted as the new tail node. As one option, the updating of the tail pointer may include an atomic operation.

Figure 5:
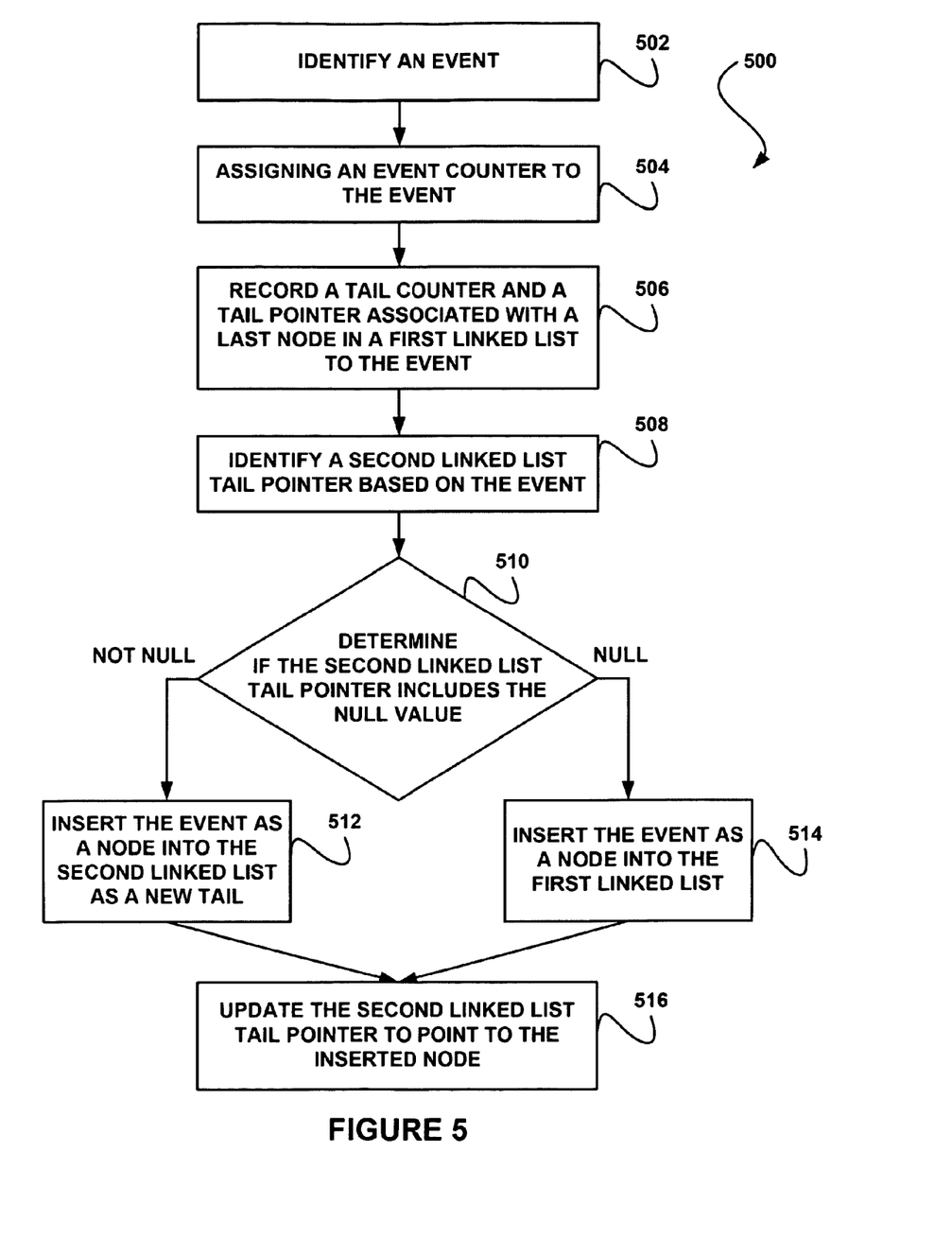
FIG. 5 illustrates a method for inserting an event into a data structure, in accordance with still yet another embodiment.

FIG. 5 shows a method 500 for inserting an event into a data structure, in accordance with still yet another embodiment. As an option, the method 500 may be carried out in the context of the details of FIGS. 1-4. Of course, however, the method 500 may be carried out in any desired environment. Again, the aforementioned definitions may equally apply to the description below.

As shown in operation 502, an event is identified. As an example, the event may be identified based on being received, waiting to be added to a data structure (e.g. the data structure 300 of FIG. 3), etc. Further, as shown in operation 504, an event counter is assigned to the event. Optionally, the event counter may include a unique identifier.

Optionally, the event counter may be based on a sequence of identifying events. As an example, a first event may be assigned a first identifier in the sequence, and a second event may be assigned a second identifier in the sequence. Further, as yet another option, the event counter may be stored in the event, stored in a head pointer of the event, stored in a tail pointer of the event, associated with the event, etc.

In addition, a tail counter and a tail pointer associated with a last node in a first linked list are recorded to the event. See operation 506. The tail counter may include an event counter associated with the last node in the first linked list pointed to by the tail pointer. For example, the tail counter and the tail pointer may be utilized to narrow a search on the first linked list.

Additionally, as shown in operation 508, a second linked list tail pointer is identified based on the event. As an option, a characteristic of the event may be utilized to identify the second linked list tail pointer from a plurality of second linked list tail pointers. Optionally, the characteristic of the event may include a characteristic associated with the second linked list tail pointer. For example, the second linked list tail pointer characteristic may be associated with a particular customer, processing thread, event source, etc. As another option, the characteristic associated with each second linked list tail pointer may be predetermined. Further, as still yet another option, the number of tail pointers in the plurality of second linked list tail pointers may be predetermined, dynamically determined, statically determined, etc.

As shown in decision 510, it is determined if the second linked list tail pointer includes a null value. Thus, as an option, the second linked list tail pointer may include a pointer to a node or a null value. For example, if there is at least one node in the second linked list associated with the second linked list tail pointer, then the second linked list tail pointer may point to a last node in the second linked list, and may therefore not be null.

If second linked list tail pointer is not null, then the event is inserted as a node into the second linked list as a new tail. See operation 512. Optionally, inserting the node into the second linked list may include updating the pointer of a previous last node (e.g. previous to the insertion of the event) to point to the inserted node. Additionally, as an option, a pointer of the inserted node may include a null value.

If the second linked list tail pointer is null, then the event is inserted as a node into the first linked list. See operation 514. As an option, the tail pointer associated with the last node in the first linked list may be utilized to identify a current tail node in the first linked list. As another option, the tail pointer stored in the event may be utilized to identify the current tail node in the first linked list.

Further, as yet another option, the current tail node in the first linked list may be verified as a tail node by verifying that the head pointer includes a null value. Optionally, if the head pointer of the current tail node of the first linked list does not include the null value, then a new tail node may have been added to the first linked list before the event was inserted as the node in the first linked list. Additionally, as an option, if the new tail node was added, then the head pointer from the current tail node may be followed to the new tail node. Furthermore, as another option, a head pointer of the new tail node may be verified and followed until reaching a tail node including a head pointer that includes a null value.

Further, as yet another option, the head pointer of the verified tail node in the first linked list may be updated to point to the inserted node. As still yet another option, the tail pointer associated with the first linked list may be updated to point to the inserted node. For example, after inserting the node into the first linked list, the tail pointer associated with the first linked list may be updated to point to the inserted node.

Furthermore, as shown in operation 516, the second linked list tail pointer is updated to point to the inserted node. As an option, the second linked list tail pointer may indicate that the inserted node is the last node in the second linked list. Optionally, the second linked list tail pointer may indicate that the inserted node is the only node in the second linked list.

In one exemplary embodiment, the event may include a priority. Optionally, the priority may be indicated by a numerical range, a value in a range of values, or any other value capable of indicating the priority. As another option, a higher priority event may be processed before a lower priority event.

Optionally, the event may be inserted into the data structure as a node based on the priority. Further, as an option, the node may be inserted into a third linked list of the data structure based on the priority. As another option, if the node is a first node in the third linked list, then a pointer of a node in the second linked list may point to the node inserted into the third linked list. As yet another option, if the node is not the first node in the third linked list, then a last node in the third linked list may point to the node inserted into the third linked list.

For example, if the event is a first event associated with a high priority, it may be inserted as a new node into the third linked list pointed to by a pointer of a node in the second linked list. As another example, if the event is a subsequent event associated with a high priority, it may be inserted as a new tail node into the third linked list. In the context of the current example, a previous tail node in the third linked list may be updated to point to the new tail node in the third linked list.

Figure 6:
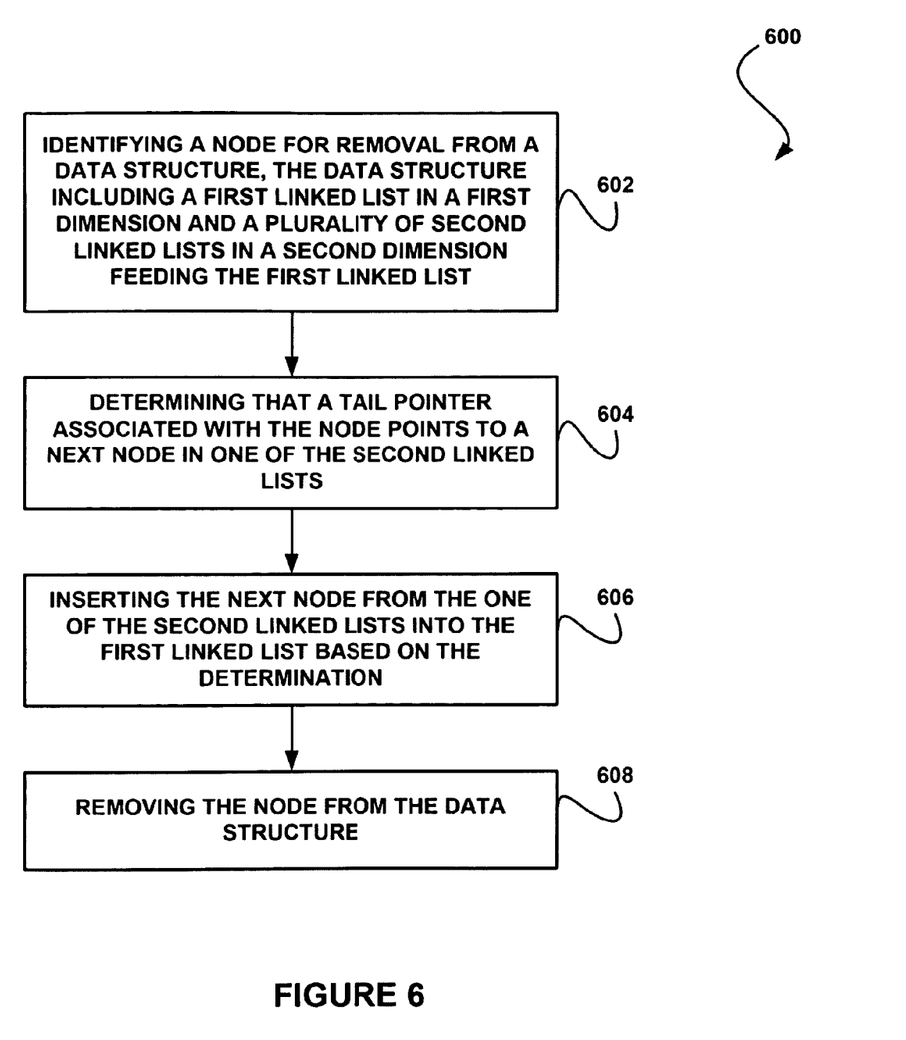
FIG. 6 illustrates a method for removing a node from a data structure, in accordance with one embodiment.

FIG. 6 shows a method 600 for removing a node from a data structure, in accordance with one embodiment. As an option, the method 600 may be carried out in the context of the details of FIGS. 1-5. Of course, however, the method 600 may be carried out in any desired environment. Further, the aforementioned definitions may equally apply to the description below.

As shown in operation 602, a node is identified for removal from a data structure, the data structure including a first linked list in a first dimension and a plurality of second linked lists in a second dimension feeding the first linked list. In one embodiment, the data structure may include the data structure 300 described above with respect to FIG. 3. As an option, the node may include any node capable of being identified for removal. Optionally, the node may be included in the first linked list. Further, as yet another option, the node may include a first node in the first linked list that has not been previously identified for removal.

Further, in one embodiment, the node may be indicated for removal. Optionally, indicating the node for removal may include marking the node, setting a flag, updating a value, and/or updating any information associated with the identified node to indicate removal. Additionally, as yet another option, indicating the node for removal may include an atomic operation. For example, the marking of the node for removal may include atomically updating a counter associated with the node to indicate removal.

Further, as shown in operation 604, a tail pointer associated with the node is determined to point to a next node in one of the second linked lists. Thus, the tail pointer associated with the node may point to the next node in one of the second linked lists.

In addition, the next node from the one of the second linked lists is inserted into the first linked list based on the determination. See operation 606. In this way, if the tail pointer associated with the node points to the next node, then the next node may be inserted into the first linked list. Optionally, a counter associated with the next node may be utilized for insertion. For example, the counter may indicate a position in the first linked list where the next node may be inserted. Further, as yet another option, the next node may be inserted before another node in the first linked list that includes a counter greater than the counter included with the next node.

Furthermore, in yet another embodiment, additional pointers associated with the first linked list may be updated. As an option, a head pointer of the first linked list may be updated to point to a second node in the first linked list pointed to by a pointer of the node. Further, as yet another option, if the next node was inserted as a new tail node in the first linked list, then a tail pointer of the first linked list may be updated to point to the next node as the new tail node.

Furthermore, as shown in operation 608, the node is removed from the data structure. Additionally, as an option, removing the node from the data structure may include removing the node from the first linked list. Optionally, removing the node from the first linked list may include updating the head pointer of the first linked list to point to another node in the first linked list. For example, by updating any pointer pointing to the node to point to another node, the node may be removed from the first linked list. In addition, as another option, removing the node may include processing the node. For example, processing the node may include handling an event associated with the node.

Figure 7:
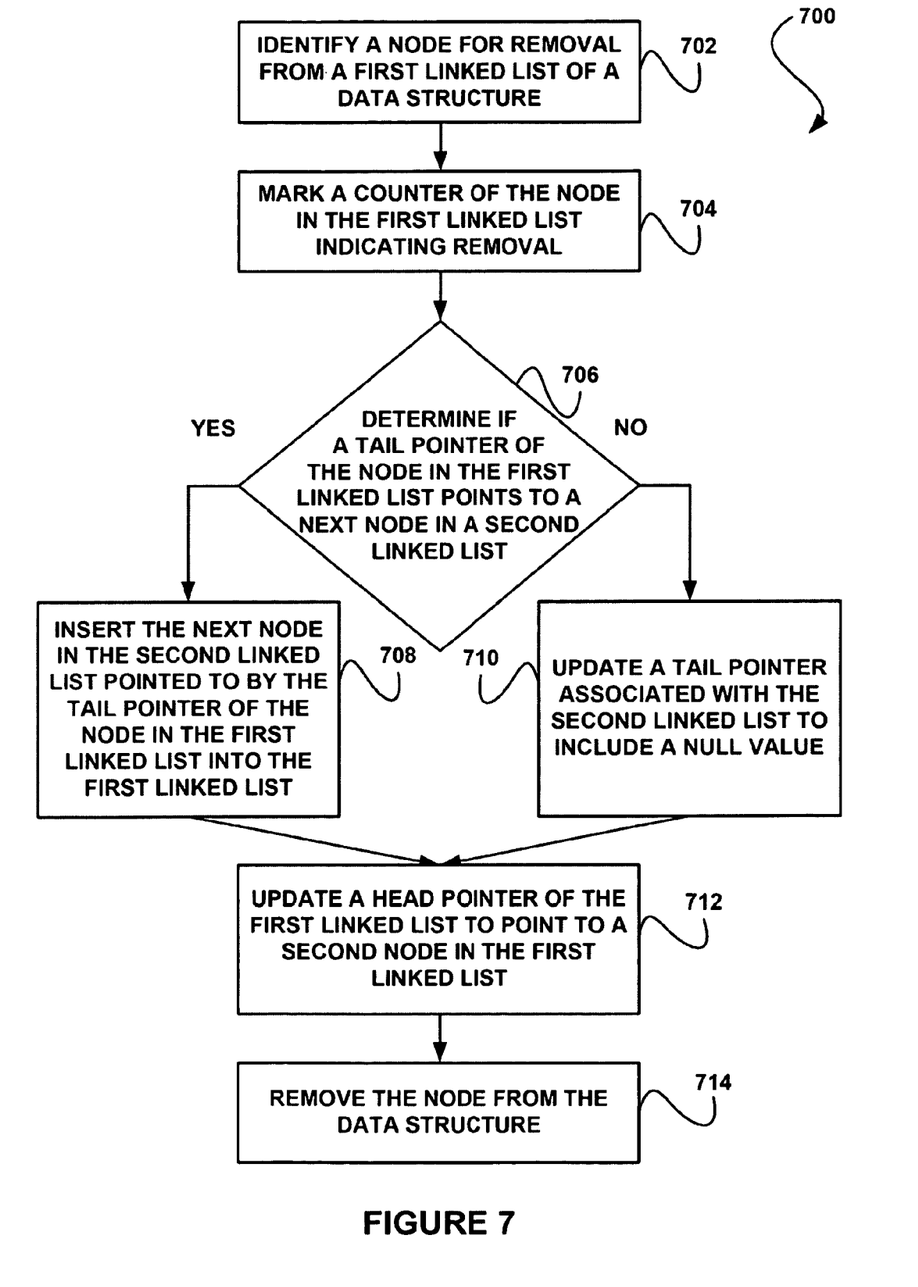
FIG. 7 illustrates a method for removing a node from a data structure, in accordance with another embodiment.

FIG. 7 shows a method 700 for removing a node from a data structure, in accordance with another embodiment. As an option, the method 700 may be carried out in the context of the details of FIGS. 1-6. Of course, however, the method 700 may be carried out in any desired environment. Further, the aforementioned definitions may equally apply to the description below.

As shown in operation 702, a node is identified for removal from a first linked list of a data structure. With respect to the present embodiment, the data structure may include the data structure 300 described above with respect to FIG. 3. As an option, the node identified for removal from the first linked list may include a node not previously identified for removal. Optionally, the node in the first linked list may be identified for removal utilizing a head pointer associated with the first linked list. For example, the head pointer associated with the first linked list may point to the node in the first linked list identified for removal.

Further, a counter of the node in the first linked list is marked indicating removal. See operation 704. As another option, the counter may include a value, a flag, and/or any other data capable of indicating that the node in the first linked list is marked for removal. For example, after the node in the first linked list is identified, the counter associated with the node in the first linked list may be updated to indicate that the node in the first linked list is marked for removal. Optionally, the operation of marking the node in the first linked list for removal may include an atomic operation.

In addition, as shown in decision 706, it is determined if a tail pointer of the node in the first linked list points to a next node in a second linked list. Thus, the tail pointer of the node in the first linked list may point to the next node in the second linked list or a null value.

If it is determined that the tail pointer of the node in the first linked list points to the next node in the second linked list, then the next node is inserted into the first linked list. See operation 708. Optionally, inserting the next node into the first linked list may include utilizing an event counter associated with the next node to determine an insertion position in the first linked list.

Further, as an option, determining the insertion position in the first linked list may include utilizing a tail pointer and/or a tail counter stored in the next node to perform a search of the first linked list. In addition, as yet another option, performing the search of the first linked list may include following a head pointer of a potential tail node pointed to by the tail pointer to a current search node, and comparing the event counter associated with the next node to an event counter associated with the current search node.

As still yet another option, if the event counter associated with the current search node is greater than the event counter associated with the next node, then the next node is inserted before the current search node. For example, inserting the next node before the current search node may include updating a head pointer of the next node to point to the current search node, and updating a head pointer of a previous search node to point to the next node.

Optionally, if the search of the first linked list reaches a last node in the first linked list without finding the current search node with the event counter greater than the event counter of the next node, then the next node may be inserted as a new tail of the first linked list. Furthermore, if the next node is inserted as the new tail of the first linked list, then the tail pointer associated with the first linked list may be updated to point to the next node. As an example, after inserting the next node into the first linked list, each node before the next node in the first linked list may be include a smaller event counter than the event counter associated with the next node. Optionally, the smaller event counter may include an older event counter.

If it is determined that the tail pointer of the node does not point to the next node in the second linked list, then a tail pointer associated with the second linked list is updated to include the null value. See operation 710. For example, updating the tail pointer associated with the second linked list to include to the null value may indicate that there are not any additional nodes associated with the tail pointer associated with the second linked list.

In one embodiment, if the node in the first linked list includes a priority pointer to a node in a third linked list, then the node in the third linked list may be inserted after the node in the first linked list. Optionally, the third linked list may include a priority linked list. Additionally, a yet another option, the node in the third linked list may be inserted after the node in the first linked list by updating the head pointer of the node in the first linked list to point to the node in the third linked list, and by further updating a head pointer of the node in the third linked list to point to the second node in the first linked list.

Further, a head pointer of the first linked list is updated to point to a second node in the first linked list. See operation 712. For example, the head pointer associated with the first linked list may be updated to point to the second node in the first linked list. Optionally, the head pointer associated with the first linked list may be updated as the atomic operation.

As shown in operation 714, the node in the first linked list is removed from the data structure. As an option, the node in the first linked list may be removed from the data structure by updating all pointers that point to the node in the first linked list to point to another node and/or point to the null value. Optionally, removing the node in the first linked list may include updating the ready head pointer to point to the second node. Additionally, as yet another option, removing the node in the first linked list may include handling an event associated with the node in the first linked list. For example, the node in the first linked list may be removed from the data structure by updating the ready head pointer to point to the second node in the first linked list. As yet another option, if the node in the first linked list was the last node associated with the second linked list, then removing the node in the first linked list may include updating the tail pointer of the second linked list to the null value.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A data structure embodied on a tangible computer readable medium, comprising:
    a linked list in a first dimension, the linked list in the first dimension including a plurality of nodes, each node including a head pointer and a tail pointer;
    a plurality of linked lists in a second dimension;
    an additional pointer associated with each linked list in the second dimension, each of the additional pointers including a second dimension linked list tail pointer pointing to a last node in the one of the linked lists in the second dimension; and
    an event counter stored in the head pointer and the tail pointer for each node, each event counter based on a sequence of identifying events;
    wherein the tail pointer of one of the nodes in the linked list in the first dimension points to a first node in one of the linked lists in the second dimension.

2. The data structure of claim 1, wherein the linked list in the first dimension includes a ready queue.

3. The data structure of claim 1, wherein each of the linked lists in the second dimension includes a sticky queue.

4. The data structure of claim 1, wherein the event counter for each node is unique.

5. The data structure of claim 1, wherein the head pointer of the one of the nodes in the linked list in the first dimension points to a next one of the nodes in the linked list in the first dimension.

6. The data structure of claim 1, wherein a node in the one of the linked lists in the second dimension includes a pointer to a next node in the one of the linked lists in the second dimension.

7. The data structure of claim 1, further including a plurality of linked lists in a third dimension.

8. The data structure of claim 7, wherein a node in the one of the linked lists in the second dimension includes another pointer to a first node in one of the linked lists in the third dimension.

9. A computer program product embodied on a tangible computer readable medium, comprising:
 computer code for identifying an event for insertion into a data structure, the data structure including a first linked list in a first dimension and a plurality of second linked lists in a second dimension feeding the first linked list;
 computer code for providing an additional pointer associated with each second linked list in the second dimension, each of the additional pointers including a second dimension linked list tail pointer pointing to a last node in the one of the linked lists in the second dimension;
 computer code for identifying a tail pointer associated with one of the second linked lists based on the event;
 computer code for inserting the event as a node into the data structure based on the tail pointer, where if the tail pointer is null, the node is inserted into the first linked list, and if the tail pointer is not null, the node is inserted as a new tail for the one of the second linked lists, and the tail pointer associated with the one of the second linked lists is updated;
 computer code for assigning an event counter to the event, the event counter based on a sequence of identifying events and stored in a head pointer of the event and a tail pointer of the event;
 wherein the computer program product is operable such that a tail counter and a tail pointer associated with a last node in the first linked list are recorded to the event, the tail counter including an event counter associated with the last node in the first linked list pointed to by the tail pointer associated with the last node in the first linked list.

10. The computer program product of claim 9, wherein the tail pointer is identified based on a characteristic of the event.

11. The computer program product of claim 9, wherein updating the tail pointer associated with the one of the second linked lists includes pointing the tail pointer to the inserted node.

12. The computer program product of claim 9, wherein the updating of the tail pointer is an atomic operation.

13. A method, comprising:
 identifying an event for insertion into a data structure, the data structure including a first linked list in a first dimension and a plurality of second linked lists in a second dimension feeding the first linked list;
 providing an additional pointer associated with each second linked list in the second dimension, each of the additional pointers including a second dimension linked list tail pointer pointing to a last node in the one of the linked lists in the second dimension;
 identifying, utilizing a processor, a tail pointer associated with one of the second linked lists based on the event;
 inserting the event as a node into the data structure based on the tail pointer, where if the tail pointer is null, the node is inserted into the first linked list, and if the tail pointer is not null, the node is inserted as a new tail for the one of the second linked lists, and the tail pointer associated with the one of the second linked lists is updated; and
 assigning an event counter to the event, the event counter based on a sequence of identifying events and stored in a head pointer of the event and a tail pointer of the event;
 wherein a tail counter and a tail pointer associated with a last node in the first linked list are recorded to the event, the tail counter including an event counter associated with the last node in the first linked list pointed to by the tail pointer associated with the last node in the first linked list.

14. The method of claim 13, further including verifying the last node in the first linked list as a tail node by verifying that a head pointer of the last node of the first linked list includes a null value, and when the head pointer does not include a null value, such that a new tail node was added to the first linked list before the event was inserted as the node in the first linked list:
 following the head pointer from the last node to a new tail node; and
 verifying a head pointer of the new tail node and following the head pointer of the new tail node until reaching a tail node including a head pointer that includes a null value.

15. The method of claim 14, further including updating the head pointer of the verified tail node in the first linked list to point to the inserted node.

16. The method of claim 13, wherein the event includes a priority, the priority including a numerical range, and the event is inserted into the data structure as a node based on the priority.

17. The method of claim 16, wherein the event inserted into the data structure as a node based on the priority is inserted into a third linked list in a third dimension of the data structure based on the priority.

18. The method of claim 17, wherein a plurality of nodes in a linked list in the third dimension pointed to by a first priority node have a higher priority than another node in one of the linked lists in the second dimension pointed to by the first priority node, such that the another node of the one of the linked lists in the second dimension includes a pointer to the first priority node in the linked list in the third dimension, the first priority node includes a pointer to a second priority node, and the second priority node includes a pointer to a null value.

19. The method of claim 18, wherein the another node of the one of the linked lists in the second dimension, the first priority node in the linked list in the third dimension, and the second priority node each include a priority higher than the priority of a next another node in the linked list in the second dimension pointed to by the another node of the one of the linked lists in the second dimension.

20. A computer program product embodied on a tangible computer readable medium, comprising:
 computer code for identifying a node for removal from a data structure, the data structure including a first linked list in a first dimension and a plurality of second linked lists in a second dimension feeding the first linked list;
 computer code for providing an additional pointer associated with each second linked list in the second dimension, each of the additional pointers including a second dimension linked list tail pointer pointing to a last node in the one of the linked lists in the second dimension;
 computer code for marking the node for removal;
 computer code for determining if a tail pointer associated with the node points to a next node in one of the second linked lists;
 computer code for inserting the next node from the one of the second linked lists into the first linked list based on the determination, an insertion position in the first linked list determined utilizing a tail pointer and a tail counter stored in the next node to perform a search of the first linked list, the performing the search of the first linked list including following a head pointer of a potential tail node pointed to by the tail pointer to a current search node, and comparing the event counter associated with the next node to an event counter associated with the current search node; and computer code for removing the node from the data structure;

wherein the computer program product is operable such that the next node is inserted before the current search node when the event counter associated with the current search node is greater than the event counter associated with the next node;

wherein the computer program product is operable such that the next node is inserted as a new tail of the first linked list when the search of the first linked list reaches a last node in the first linked list without finding the current search node with the event counter greater than the event counter of the next node.

21. The computer program product of claim 20, wherein the marking of the node for removal includes atomically updating a counter associated with the node.

22. A method, comprising:

identifying a node for removal from a data structure, the data structure including a first linked list in a first dimension and a plurality of second linked lists in a second dimension feeding the first linked list;

providing an additional pointer associated with each second linked list in the second dimension, each of the additional pointers including a second dimension linked list tail pointer pointing to a last node in the one of the linked lists in the second dimension;

marking the node for removal;

determining if a tail pointer associated with the node points to a next node in one of the second linked lists;

inserting, utilizing a processor, the next node from the one of the second linked lists into the first linked list based on the determination, an insertion position in the first linked list determined utilizing a tail pointer and a tail counter stored in the next node to perform a search of the first linked list, the performing the search of the first linked list including following a head pointer of a potential tail node pointed to by the tail pointer to a current search node, and comparing the event counter associated with the next node to an event counter associated with the current search node; and removing the node from the data structure;

wherein the next node is inserted before the current search node when the event counter associated with the current search node is greater than the event counter associated with the next node;

wherein the next node is inserted as a new tail of the first linked list when the search of the first linked list reaches a last node in the first linked list without finding the current search node with the event counter greater than the event counter of the next node.

* * * * *